United States Patent
Nelson et al.

(10) Patent No.: US 11,753,342 B2
(45) Date of Patent: *Sep. 12, 2023

(54) ADDITIVE FORMULATION FOR REDUCTION OR PREVENTION OF MICROBIALLY INDUCED CORROSION IN CONCRETE OR CEMENTITIOUS MATERIAL

(71) Applicant: Microban Products Company, Huntersville, NC (US)

(72) Inventors: Burke Irving Nelson, Mooresville, NC (US); Ivan Weikang Ong, Charlotte, NC (US); Glenner Marie Richards, Davidson, NC (US); Daniel Ray Matthews, Supply, NC (US)

(73) Assignee: Microban Products Company, Huntersville, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/014,559

(22) Filed: Jun. 21, 2018

(65) Prior Publication Data

US 2018/0370856 A1 Dec. 27, 2018

Related U.S. Application Data

(60) Provisional application No. 62/524,168, filed on Jun. 23, 2017.

(51) Int. Cl.
| | | |
|---|---|---|
| *C04B 28/24* | (2006.01) | |
| *A01N 43/653* | (2006.01) | |
| *C04B 28/02* | (2006.01) | |
| *C04B 40/00* | (2006.01) | |
| *A01N 55/00* | (2006.01) | |
| *C04B 111/26* | (2006.01) | |
| *C04B 103/69* | (2006.01) | |
| *C04B 103/50* | (2006.01) | |

(52) U.S. Cl.
CPC ............ *C04B 28/24* (2013.01); *A01N 43/653* (2013.01); *A01N 55/00* (2013.01); *C04B 28/02* (2013.01); *C04B 40/0039* (2013.01); *C04B 2103/50* (2013.01); *C04B 2103/69* (2013.01); *C04B 2111/26* (2013.01)

(58) Field of Classification Search
CPC ...... A01N 43/653; A01N 55/00; C04B 28/02; C04B 28/24; C04B 40/0039; C04B 2103/50; C04B 2103/69; C04B 2111/26
See application file for complete search history.

(56) References Cited

U.S. PATENT DOCUMENTS

| | | | |
|---|---|---|---|
| 5,226,954 A | 7/1993 | Suzuki | |
| 8,178,119 B2* | 5/2012 | Stutte | A01N 43/40 424/403 |
| 2005/0008763 A1 | 1/2005 | Schacheter | |
| 2006/0193816 A1* | 8/2006 | Elfersy | A01N 59/00 424/70.28 |
| 2007/0163964 A1* | 7/2007 | Williamson | C02F 1/50 210/736 |
| 2010/0028265 A1 | 2/2010 | Bolkan et al. | |
| 2010/0028462 A1 | 2/2010 | Bolkan et al. | |
| 2011/0233810 A1 | 9/2011 | Neigel et al. | |
| 2017/0071198 A1 | 3/2017 | Neigel | |

FOREIGN PATENT DOCUMENTS

| | | | | |
|---|---|---|---|---|
| CN | 1989005 A | * | 6/2007 | ............ A01N 33/12 |
| CN | 103820995 A | | 5/2014 | |
| CN | 104472530 A | | 4/2015 | |
| EP | 0469624 A1 | | 2/1992 | |
| EP | 3061864 A1 | | 8/2016 | |
| WO | 2005/042657 A2 | | 5/2005 | |
| WO | 2006/007044 A1 | | 1/2006 | |
| WO | 2010104831 A1 | | 9/2010 | |
| WO | WO-2011123623 A2 | * | 10/2011 | ............ A61K 47/10 |
| WO | 2013/175188 A1 | | 11/2013 | |
| WO | 2016/164545 A1 | | 10/2016 | |
| WO | WO-2017114585 A1 | * | 7/2017 | .......... D06M 13/513 |

OTHER PUBLICATIONS

"The Mechanism of Action of Isothiazolone Biocides" (Williams), Mar. 12, 2006 (Mar. 12, 2006) p. 14 col. 2 paragraph 3, p. 17 col. 1 paragraph 3, Table 1.
International Search Report and Written Opinion of corresponding application PCT/US2018/38901, dated Sep. 24, 2018, all enclosed pages cited.
Supplementary European Search Report, European Application No. 18820532, dated Jan. 12, 2021, 4 pages.
Non-Final Office Action for U.S. Appl. No. 17/546,959 dated Feb. 3, 2023 (11 pages).
Non-Final Office Action for U.S. Appl. No. 17/859,421 dated Feb. 14, 2023 (10 pages).
Final Rejection issued for U.S. Appl. No. 17/546,959; dated May 11, 2023 (7 Pages).
Final Rejection issued for U.S. Appl. No. 17/859,421; dated May 11, 2023 (11 Pages).

* cited by examiner

*Primary Examiner* — Anthony J Green
(74) *Attorney, Agent, or Firm* — Shumaker, Loop & Kendrick, LLP

(57) ABSTRACT

An additive formulation for reduction or prevention of microbially induced corrosion in concrete, cementitious material (such as mortar or grout), or a combination thereof. The additive formulation comprises a Quat Silane and a fungicide, wherein the ratio of the Quat Silane to the fungicide in the formulation is in a range of about 10:1 to about 1:10, preferably in a range of about 5:1 to about 1:5.

8 Claims, 7 Drawing Sheets

ADDITIVE FORMULATION FOR REDUCTION OR PREVENTION OF MICROBIALLY INDUCED CORROSION IN CONCRETE OR CEMENTITIOUS MATERIAL

CROSS-REFERENCE TO RELATED APPLICATION

This application claims priority from U.S. provisional patent application No. 62/524,168, filed on Jun. 23, 2017, in the United States Patent and Trademark Office. The disclosure of which is incorporated herein by reference in its entirety.

FIELD OF THE INVENTION

The invention relates to the field of additive formulations, more particularly to an additive formulation used to reduce or to prevent microbially induced corrosion in concrete, in cementitious material, or a combination thereof.

BACKGROUND OF THE INVENTION

Microbially Induced Corrosion in Concrete (MICC) is an immense problem that causes premature failure of concrete structures that are exposed constantly to sewage and similar corrosive environments. Premature failure and the need for replacement is extremely costly since in such infrastructure projects, the majority of cost is not the materials (concrete) but in the construction project (labor, digging, equipment, etc.). Premature failure is also unbudgeted by municipal authorities and is therefore undesired. In some cases, failure can have serious environmental, safety, and infrastructural impact. For example, a failure of a sewage pipe can leach toxic contents into groundwater, or cause sink holes or other water pathways that can compromise building structures in the vicinity.

MICC is an issue particularly prevalent in concrete sewer pipes, where sulfur-loving bacteria convert gaseous $H_2S$ into sulfuric acid, which erodes the concrete pipes above the water line. Quat silanes (QS) (also commonly referred to as Silyl Quats or 1-Octadecanaminium, N,N-dimethyl-N-(3-(trimethoxysilyl)propyl)-, chloride) have been proposed in the industry to prevent, through antimicrobial action, the bacteria from thriving, thereby reducing or eliminating the sulfuric acid attack on the concrete. Some examples of quat silanes are Microban AEM5772, which is 72% active, and Microban AEM 5772-5 which is 3.6% active. There is preference for QS due to its compatibility with aggregates due to its silyl groups. However, currently available formulations of the quat silane are dilute in nature and make no attempt to negate the serious side effects that this chemical has on the curing and final physical properties of the concrete structures. In addition, dilute aqueous QS formulations have a short shelf-life due to hydrolytic instability.

Several academic papers have examined more closely the flora involved in MICC and, while many theories abound, most have determined that the *Thiobacillus* genus of bacteria are not the sole actors; there are fungi, particularly of the *Fusarium* genus, which are also present and seem to participate symbiotically with the bacterial species during the deterioration process. While QS in liquid state (such as in a solution or a suspension) has strong antifungal efficacy against a wide variety of fungal species, it selectively losses its efficacy against fungal species once in its "dry film" form (i.e. once the concrete has cured) while still maintaining good antibacterial efficacy. Thus, there is a need for truly effective and comprehensive protection of the concrete structure against MICC. Moreover, the complex interplay between bacterial and fungal species changes as the pH of the concrete exposed to acidifying conditions keeps dropping, resulting in the successive cascade of different microorganisms ecosystems that act upon the concrete such that each pH zone and change is characterized by its unique microorganism ecosystem.

SUMMARY OF THE INVENTION

The present invention relates to an additive formulation for reduction or prevention of microbially induced corrosion in concrete, in a cementitious material (such as mortar or grout), or a combination thereof.

In an embodiment of the invention, an additive formulation comprises: (1) a Quat Silane (QS) (also commonly referred to as a Silyl Quat or 1-Octadecanaminium, N,N-dimethyl-N-(3-(trimethoxysilyl)propyl)-, chloride), preferably as an antibacterial additive to combat *Thiobacillus* and other bacteria; (2) a fungicide, preferably to combat fusarium and other fungal species; and (3) an optional additive, preferably to offset side effects of QS in concrete. Non-limiting examples of fungicides include, but are not limited to, Sodium OrthophenylPhenol (Microban P2); Imazalil Sulphate (Microban IF4); diiodomethyl-p-tolyl sulfone; carbamates including, but not limited to, Iodopropynyl butylcarbamate (IPBC), carbendazim, and a combination thereof; isothiazolinones including but not limited to, OIT (2-Octyl-2H-isothiazol-3-one), DCOIT (4,5-Dichloro-2-octyl-4-isothiazolin-3-one), BBIT (N-butyl-1, 2-benzisothiazolin-3-one), and a combination thereof; azoles including, but not limited to, tebuconazole and propiconazole; chlorothalonil, zinc pyrithione, copper pyrithione, sodium pyrithione, and a combination thereof.

While the QS chemically bonds to silicates present in the final concrete mixture, fungicides in concrete generally do not. Thus, the fungicides may be vulnerable to leaching by water. The degree of vulnerability is a function of the water solubility of the fungicide, higher solubility leads to higher leaching. One of the benefits of adding QS to a concrete mixture is a large increase in the resistance of the concrete to the flow of water through its void spaces. Restricting this flow of water also inhibits the ability of the water to leach the fungicides (and any other water-soluble chemicals) from the concrete, greatly reducing any migration of the concrete. This will greatly increase the durability of the antifungal protection as well as reduce the release of these chemicals into the sewage system.

The amount of the formulation in concrete may vary based on the severity of the environment and the desired level of protection. Total formulation active levels between 75 ppm and 2500 ppm based on the weight of cement in the concrete (exclusive of the aggregate), for example, will provide good protection based on the MIC levels measured. The ratio of the QS active to the selected fungicide(s) in the formulation is in a range of about 10:1 to about 1:10, preferably in a range of about 5:1 to about 1:5.

Other additives may be present such as a defoamer. The amount of defoamer is preferably from about 2 weight % to about 25 weight % of the amount of the QS in the formulation.

Adding antifungal efficacy to the concrete treatment for MICC is a novel and important addition to the mode of action of this formulation and is significantly different than the products that are currently available. It was surprisingly found that pairing a fungicide with QS as an antibacterial active inhibits leaching and improves the durability of any antifungal actives due in part to the hydrophobicity effect of the QS in concrete.

Further areas of applicability of the present invention will become apparent from the detailed description provided hereinafter. It should be understood that the detailed description and specific examples, while indicating the preferred embodiments of the invention, are intended for purposes of illustration only and are not intended to limit the scope of the invention.

BRIEF DESCRIPTION OF THE DRAWINGS

The present invention will become more fully understood from the detailed description and the accompanying drawings, which are not necessarily to scale, wherein.

DESCRIPTION OF THE PREFERRED EMBODIMENTS

Figure 1:
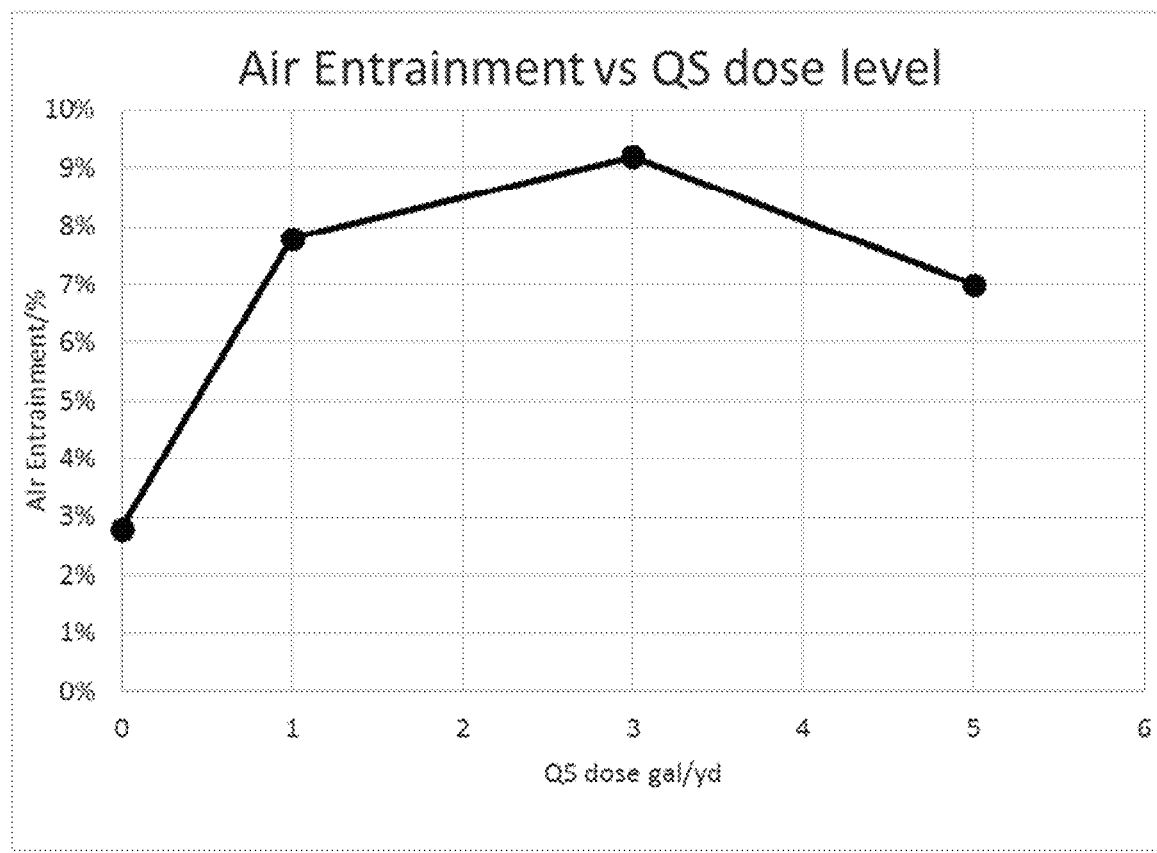
FIG. 1 is a graphical depiction of air entrainment versus QS dose level illustrating that air entrainment rises as the level of QS increases.

The following description of the embodiments of the present invention is merely exemplary in nature and is in no way intended to limit the invention, its application, or uses. The present invention has broad potential application and utility. The following description is provided herein solely by way of example for purposes of providing an enabling disclosure of the invention, but does not limit the scope or substance of the invention.

As used herein, the terms "microbe" or "microbial" should be interpreted to refer to any of the microscopic organisms studied by microbiologists or found in the use environment of a treated article. Such organisms include, but are not limited to, bacteria and fungi as well as other single-celled organisms such as mold, mildew and algae. Viral particles and other infectious agents are also included in the term microbe.

"Antimicrobial" further should be understood to encompass both microbicidal and microbistatic properties. That is, the term comprehends microbe killing, leading to a reduction in number of microbes, as well as a retarding effect of microbial growth, wherein numbers may remain more or less constant (but nonetheless allowing for slight increase/decrease).

For ease of discussion, this description uses the term antimicrobial to denote a broad spectrum activity (e.g. against bacteria and fungi). When speaking of efficacy against a particular microorganism or taxonomic rank, the more focused term will be used (e.g. antifungal to denote efficacy against fungal growth in particular).

Using the above example, it should be understood that efficacy against fungi does not in any way preclude the possibility that the same antimicrobial composition may demonstrate efficacy against another class of microbes.

For example, discussion of the strong antibacterial efficacy demonstrated by a disclosed embodiment should not be read to exclude that embodiment from also demonstrating antifungal activity. This method of presentation should not be interpreted as limiting the scope of the invention in any way.

The terms "concrete" and "cementitious material", as used herein, are interchangeable for purposes of the present invention.

Further, the term "or" as used in this disclosure and the appended claims is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form. Throughout the specification and claims, the following terms take at least the meanings explicitly associated herein, unless the context dictates otherwise. The meanings identified below do not necessarily limit the terms, but merely provided illustrative examples for the terms. The meaning of "a," "an," and "the" may include plural references, and the meaning of "in" may include "in" and "on." The phrase "in one embodiment," as used herein does not necessarily refer to the same embodiment, although it may.

The additive formulation of the present invention is useful to treat concrete structures that are susceptible to microbially induced corrosion (MICC) (e.g. culverts, pipes, underground drains, manholes structures, etc.) in order to slow or prevent MICC, extending the useful life of such components. Replacing buried sewer components is extremely expensive, so extending the engineering life of the pipes and components is extremely important.

The additive formulation is to be formulated with fungicides as well as the QS (which is mostly antibacterial), considerably broadening the range of protection that it offers. QS is extremely effective against fungi in the wet state, but not as strong in the dry state. In addition, the additive formulation comprises ingredients that counteract any negative side effects of QS on the concrete products.

In an embodiment of the invention, the additive formulation comprises: (1) QS, as an antibacterial additive to combat *Thiobacillus* and other bacteria; (2) at least one additive to offset a side effect(s) of QS in concrete; and (3) at least one fungicide to combat fusarium and other fungal species. The ratio of QS to fungicide is in a range of about 10:1 to about 1:10, preferably in a range of about 5:1 to about 1:5. These ingredients are preferentially mixed in a non-aqueous or water-free, maximum concentration formulation to prevent QS hydrolysis and extend the shelf life of the formulation, as well as to reduce the volume of the material that would be required to be shipped and stored at a major worksite. A maximum concentration formulation can have, for example, active QS in a range of from about 3.6 weight % active to 72 weight % active. Alternatively, an RTU (Ready-To-Use) formulation can be prepared by dilution with water for ease of use on-site as long as shelf life restrictions are observed to avoid degradation by hydrolysis. The formulation of the present invention is dispersible in water.

Examples of an additive to offset a side effect(s) of QS in concrete include, but are not limited to, a defoamer, an accelerant (such as calcium nitrate and/or sodium thiocyanate), a corrosion inhibitor (such as calcium nitrite), an additive to reduce water permeability (such as a crystallization admixture), an additive to control slump/flowability (such as a superplasticizer), or a combination thereof. Non-limiting examples of defoamers include, but are not limited to, polyether amine, ethoxylated alcohol, or silicone-based defoamers, tributyl phosphate, or a combination thereof.

Among the advantages of the formulation of the invention are the following: It is a ready-to-use formulation that incorporates most or all ingredients in the appropriate proportions reduces the chance for mixing errors in the field, and eases logistics on site as there are few items to track and store. An incorporated defoamer removes and/or reduces excess entrained air that negatively affects the performance of the concrete. Aqueous QS, during the wet state of the concrete, will effectively reduce and kill bacteria and fungus so that the finished concrete object is created without entrained microbes. Cured QS in the final concrete object will provide good long term antibacterial protection against organisms such as the *Thiobacillus*. It will also provide increased hydrophobicity and increase the durability of incorporated antifungal components by reducing leaching out of the concrete. An incorporated fungicide will provide good long term protection from fungal organisms such as *Fusarium*. The use of QS allows the effective employment of the additional antifungal component in a durable manner as the QS, in cured concrete, decreases water permeability and hence prevents a constantly active high pH environment (pH is operative when there is moisture) within the concrete and allows employment of fungicides that might otherwise be susceptible to hydrolytic instability due to the high pH and greatly reduces water gradients and capillary movement in the concrete and thus inhibits the fungicide from being leached out.

EXAMPLES

Example 1

Table 1 indicates the MIC values generated against *Th. Novella*, *Fusarium* and a combination of the two for two antifungal additives that were tested in the aqueous state.

TABLE 1

Active Ingredient Minimum Inhibitory Concentration Results

| Antifungal/QS | *Starkeya novella** (ppm) | *Fusarium oxysporum* (ppm) | *Starkeya** + *Fusarium* (ppm) |
|---|---|---|---|
| QS | 7.8 | 15.6 | 31.3 |
| P2 | Untested | 250 | 125 |
| IF4 | Untested | 500 | 500 |

**Starkeya novella* and *Thiobacillus novella* are names for the same organism

The results in Table 1 indicated that in the aqueous state, the QS was a stronger antifungal (lower concentration required for efficacy) than the trialed antifungals.

In addition to testing the active ingredients alone, MIC tests were conducted for combinations of the QS and the antifungal actives. An OIT active material was added to this test using the QS molecule to compatibilize the mixture, making the mixture water soluble so MIC testing was possible. Table 2 summarizes the MIC data generated for these actives:

TABLE 2

Active Combo Minimum Inhibitory Concentration Results

| Antifungal/QS | *Starkeya novella* (ppm) | *Fusarium oxysporum* (ppm) | *Starkeya* + *Fusarium* (ppm) |
|---|---|---|---|
| OIT:QS | | | |
| 1:1 | 7.8 | 15.6 | 15.6 |
| 1:2 | 7.8 | 15.6 | 15.6 |
| 2:1 | 7.8 | 15.6 | 15.6 |
| P2:QS | | | |
| 1:1 | 7.8 | 62.5 | 62.5 |
| 1:2 | 7.8 | 31.3 | 31.3 |
| 2:1 | 62.5 | 62.5 | 500 |
| IF4:QS | | | |
| 1:1 | 3.9 | 31.3 | 62.5 |
| 1:2 | 3.9 | 31.3 | 31.3 |
| 2:1 | 31.3 | 62.5 | 62.5 |

Lower values indicated better performance. Compared to the charts of the MIC of the actives alone, it was apparent that the QS was providing the efficacy for the P2 and IF4 combinations—the antifungal (AF) additive was simply diluting the QS so that more of the combination was required to get performance. However, a different dynamic was seen when looking at the data for the OIT active, where the MIC values for the combo and the QS alone are the same. This indicated that the OIT was performing as well in the wet state as the QS for both the *Th. Novella*, the *Fusarium* and the combination of the two. OIT may provide better dry film antifungal performance while the QS may provide better dry film antibacterial performance. Other possible antifungal actives that could be paired with the QS are carbamates such as Iodopropynyl butylcarbamate (IPBC) or carbendazim; isothiazolinones such as DCOIT or BBIT; azoles such as tebuconazole or propiconazole; chlorothalonil, diiodomethyl-p-tolylsulfone, zinc pyrithione, copper pyrithione, sodium pyrithione, or a combination thereof; or any combination thereof.

For purposes of testing concrete, the following factors were considered.

Slump—A measure of consistency of concrete, related to flowability and workability.

Entrained Air—Microscopic air cells in concrete relieve internal pressure on the concrete by providing tiny chambers for water to expand into when it freezes. This prevents freeze-thaw cracking.

Set Time—Initial set time is the time required for the concrete to set sufficiently to resist penetration by a needle. Full cure was 28 days (for testing).

Strength—The compressive strength of the concrete (in psi).

Figure 2:
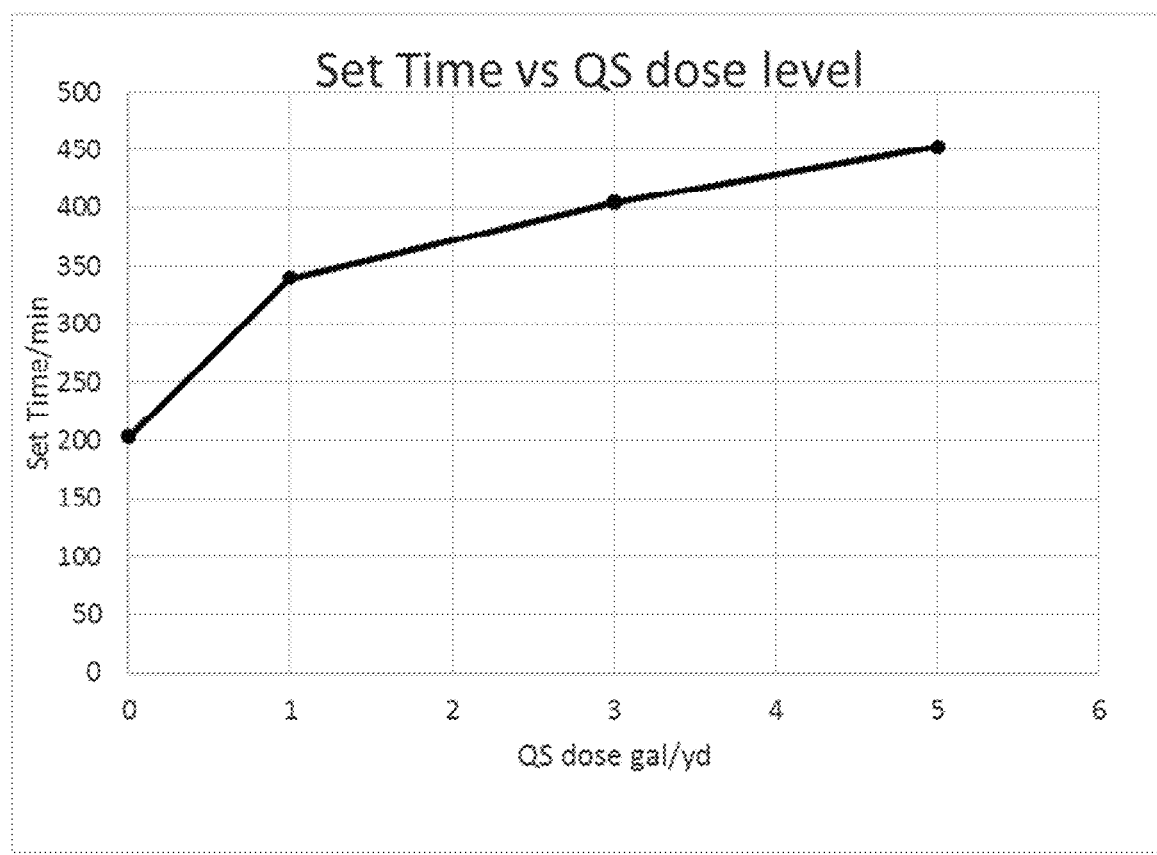
FIG. 2 is a graphical depiction of set time versus QS dose level illustrating that set time increases as the level of QS added increases.
Figure 3:
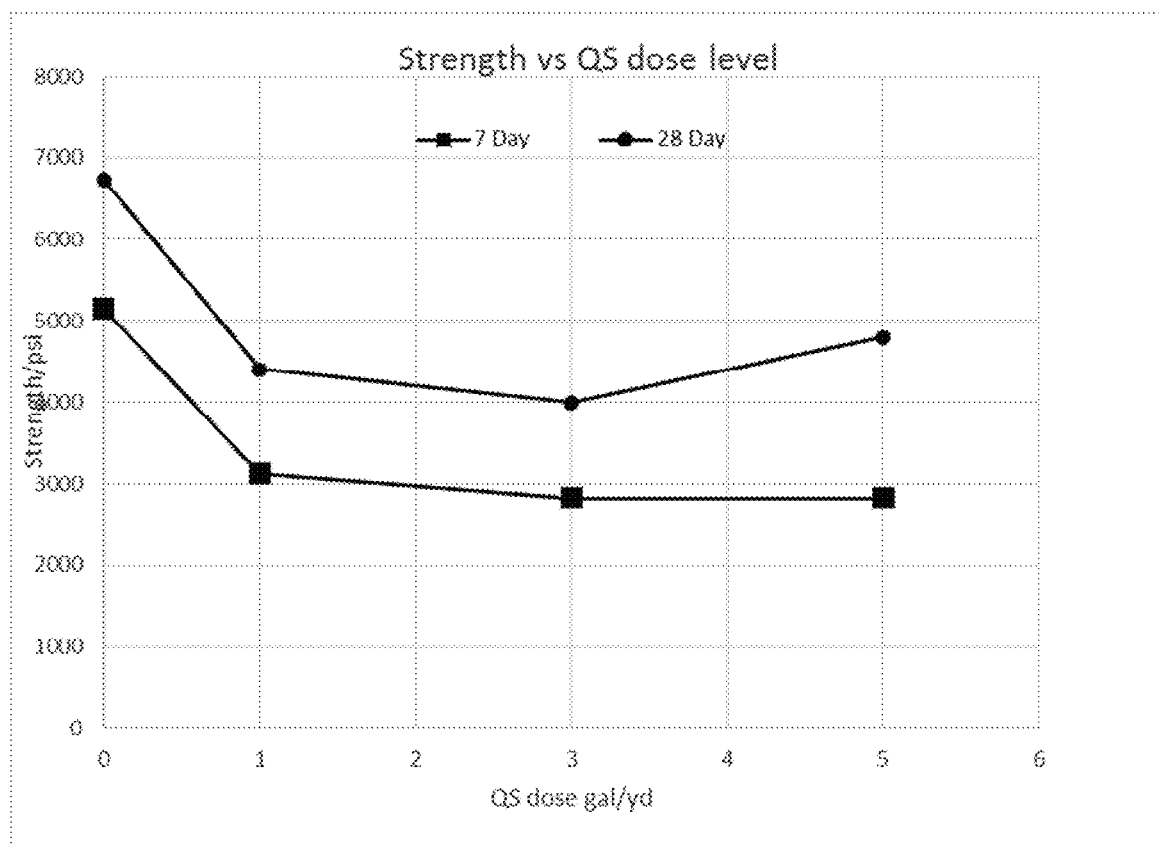
FIG. 3 is a graphical depiction of strength versus QS dose level illustrating that strength decreases as QS level increases.

The addition of QS to concrete batches was observed to have surprising and significant effects. First, the pseudo-surfactant nature of the QS molecule caused a foaming action that resulted in the concrete entraining more air than was called for by design as shown in FIG. 1. FIG. 1 is a graphical depiction of air entrainment versus QS dose level illustrating that air entrainment rises as the level of QS increases. The dose level (gal/yd) is measured as the gallons per cubic yard of a 3.6% active QS in water. Secondly, the curing reaction was retarded, resulting in longer cure times for the concrete as seen in FIG. 2. FIG. 2 is a graphical depiction of set time versus QS dose level illustrating that set time increases as the level of QS added increases. The dose level (gal/yd) is measured as the gallons per cubic yard of a 3.6% active QS in water. Strength measurements showed a decrease in 28-day compressive strength as a function of the amount of QS added (FIG. 3). FIG. 3 is a graphical depiction of strength versus QS dose level illustrating that strength decreases as QS level increases. The dose level (gal/yd) is measured as the gallons per cubic yard of a 3.6% active QS in water. It was determined the increase in entrained air was reducing strength, and controlling the entrained air removed any issues with the final strength of the material. Once these issues were properly identified, additives to control the entrained air and to accelerate the curing reaction were incorporated into the system to result in a concrete product with no measurable physical performance differences between treated and untreated (reference) samples.

TABLE 3

| Samples | Water/Concrete Ratio | Slump (inches) | Unit Weight (lb/ft$^3$) | Entrained Air % | Air % | Set Time (min) | 28 day Compressive Strength (psi) |
|---|---|---|---|---|---|---|---|
| Reference | 0.514 | 3.5 | 147 | 3.2 | 3.50 | 540 | 6870 |
| QS-5 3 gal/yd$^3$ TB: 1 oz. NC: 80 oz/yd$^3$ | 0.493 | 4.5 | 146.2 | 3.5 | 3.50 | 545 | 7070 |

Table 3 lists the properties of QS-treated and untreated concrete samples with the amounts of tributyl phosphate defoamer (TB) and calcium nitrate accelerants (NC) incorporated into the system.

Figure 4:
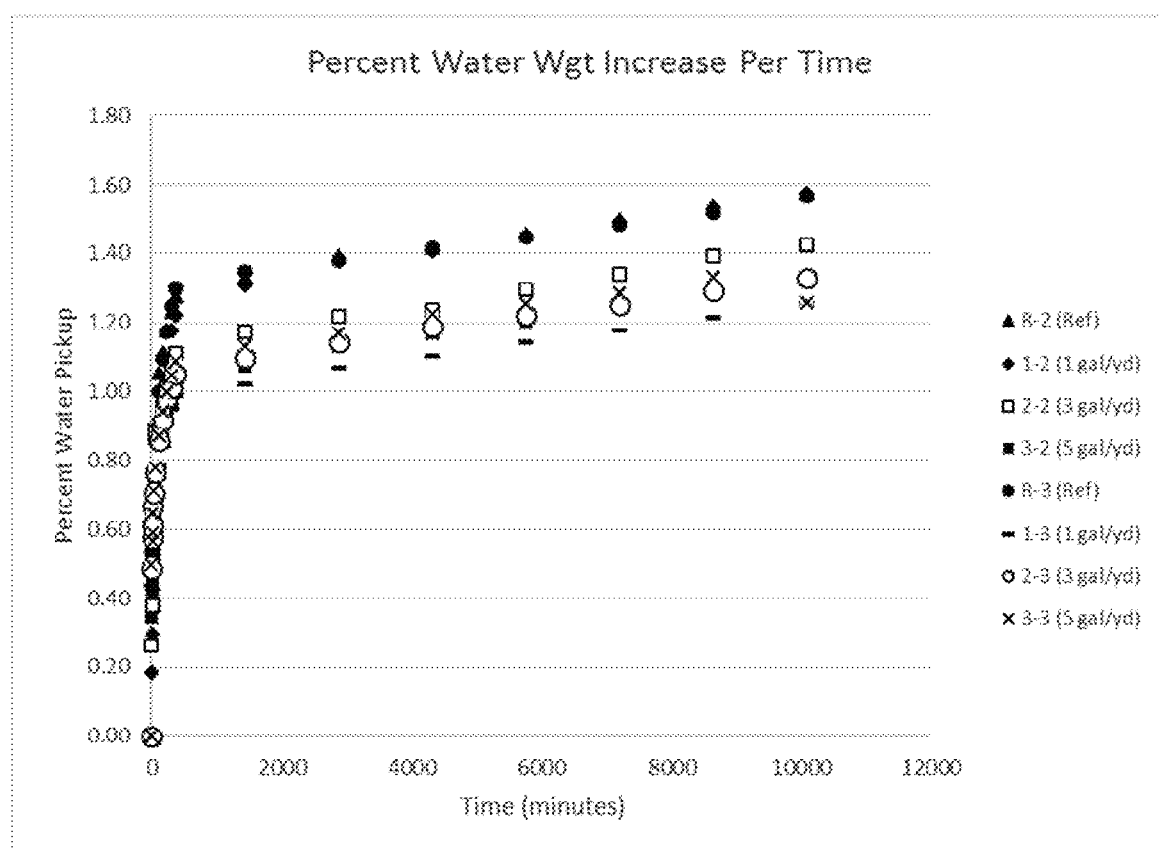
FIG. 4 is a graphical depiction of percent water weight increase per time illustrating results of water uptake testing on concrete samples per ASTM C1585-13.

Negating the side effects of the QS on the concrete was important because it allowed for higher treatment levels. The water permeability of treated concrete was shown to decrease as the letdown of QS was increased, as shown in FIG. 4. FIG. 4 is a graphical depiction of percent water weight increase per time illustrating results of water uptake testing on concrete samples per ASTM C1585-13. The abbreviation gal/yd is gallons per cubic yard of the 3.6% active QS additive. The clear trend demonstrated that the treated samples showed about a 20% decrease in the amount of water absorbed over the length of the test (7 days). The samples tested were at 0, 1, 3 and 5 gallons per cubic yard of a 3.6% active aqueous QS formulation.

Example 2—

Leachability of Fungal Additives

The leachability of antifungal additives was tested. A matrix of OPC concrete formulations was made using two water soluble antifungal additives P2 (Na OPP) and IF4 (Amazalil Sulfate), added to concrete mortar formulations with and without the QS additive as follows:
  OPC with no additives
  OPC with 5000 ppm IF4
  OPC with 5000 ppm and 3 gal/cubic yd of QS with defoamer
  OPC with 5000 ppm P2
  OPC with 5000 ppm P2 and 3 gal/cubic yd of QS with defoamer It was noted that 3 gal/cubic yd of the QS formulation corresponds to 1500 ppm of QS active by weight of the cement binder, with Tributyl phosphate (defoamer) mixed with the QS at 5% of the QS active level. Sample pucks were molded, cured and prepared for a water uptake test by drying in a 70° C. oven until weight loss had ceased. The pucks were then immersed into 30° C. water with their weight measured periodically to determine water uptake.

Figure 5:
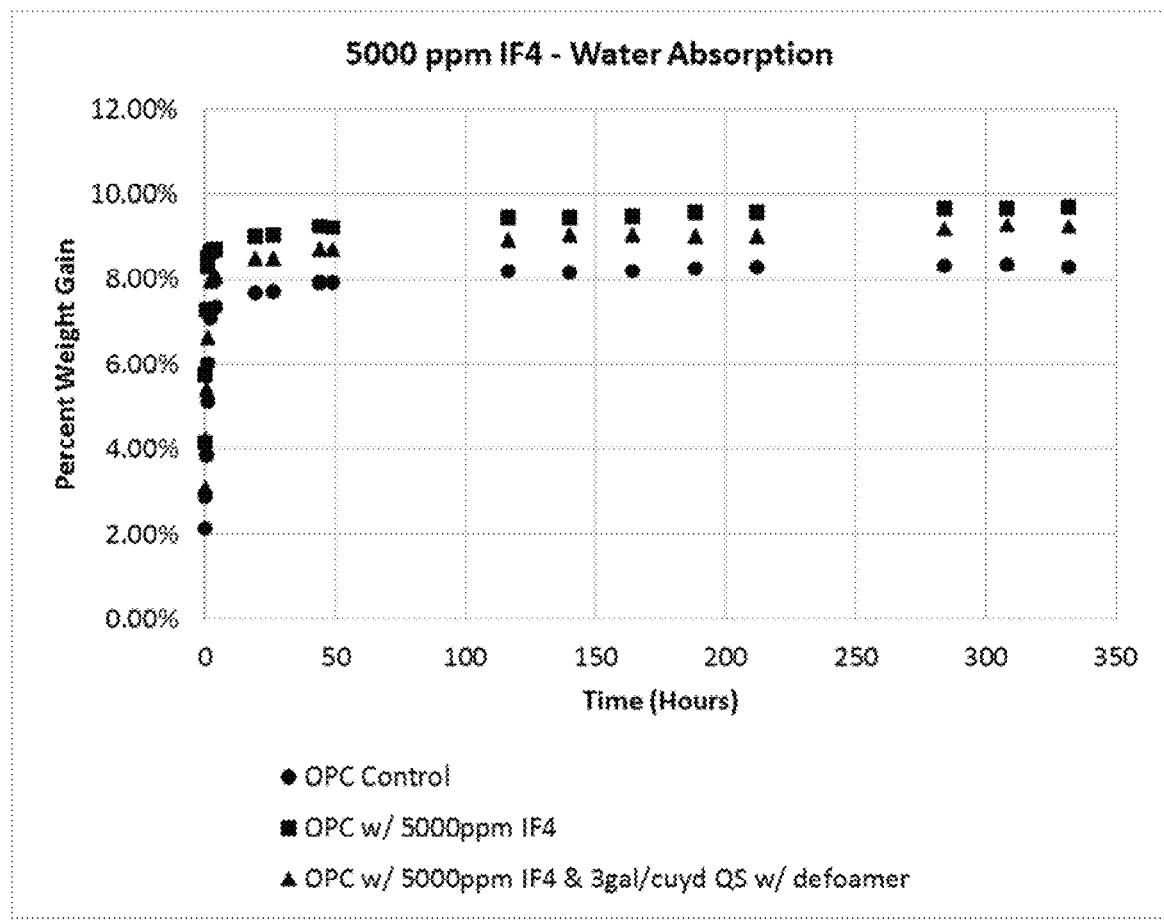
FIG. 5 is a graphical depiction of percent sample weight increase per time illustrating results of water uptake testing on Ordinary Portland Cement (OPC) concrete samples treated with IF4 and/or a QS/defoamer formulation.

FIG. 5 is a graphical depiction of percent sample weight increase per time illustrating results of water uptake testing on Ordinary Portland Cement (OPC) concrete samples treated with IF4 and/or a QS/defoamer formulation. The dose level of the QS/defoamer (gal/yd) is measured as the gallons per cubic yard of concrete of a 3.6% active QS in water. The sample pucks were dried in a 70° C. oven until the weight was stable for 24 h, then immersed into 30° C. water with their weight measured periodically to determine water uptake. Two puck samples were averaged per point. The result is expressed as a present weight gain to indicate water pickup and penetration into the sample.

Figure 6:
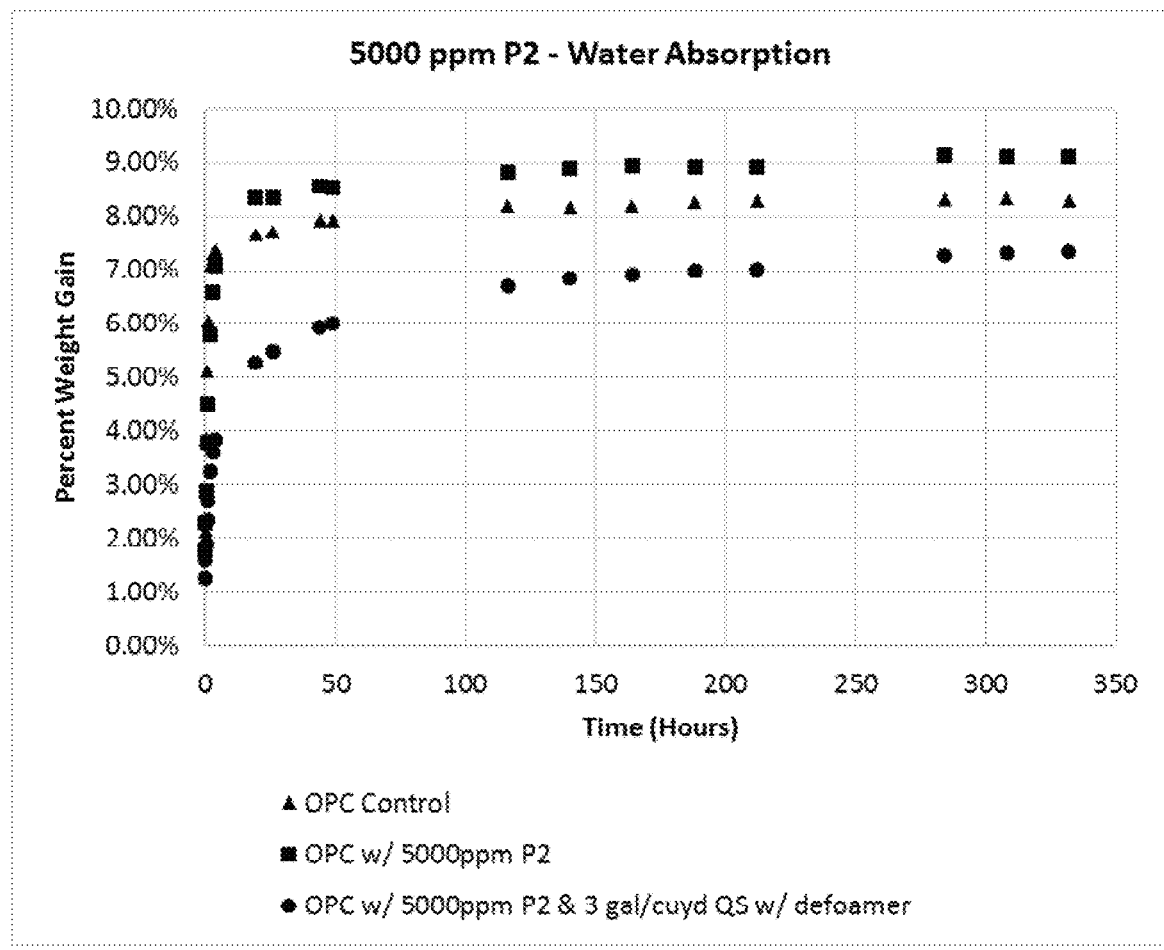
FIG. 6 is a graphical depiction of percent sample weight increase per time illustrating results of water uptake testing on Ordinary Portland Cement (OPC) concrete samples treated with P2 and/or a QS/defoamer formulation.

FIG. 6 is a graphical depiction of percent sample weight increase per time illustrating results of water uptake testing on Ordinary Portland Cement (OPC) concrete samples treated with P2 and/or a QS/defoamer formulation. The dose level of the QS/defoamer (gal/yd) is measured as the gallons per cubic yard of concrete of a 3.6% active QS in water. The sample pucks were dried in a 70° C. oven until the weight was stable for 24 h, then immersed into 30° C. water with their weight measured periodically to determine water uptake. Two puck samples were averaged per point. The result is expressed as a present weight gain to indicate water pickup and penetration into the sample.

It can be seen in FIGS. 5 and 6 that the QS treated samples gained water more slowly than the fungicide alone samples. It can also be seen that the final percent uptake for all samples are within one percent of the final uptake percentage of the untreated OPC sample, indicating little change in the internal void space of the samples and therefore little change in percent air entrainment, demonstrating the efficacy of the incorporated defoamer. Table 4 indicates results of leach testing the samples, to determine how quickly the water-soluble additives will migrate into the water:

TABLE 4

| | # Soaking Hours: | |
|---|---|---|
| | 72 | 288 |
| OPC 5000 ppm IF4 | 90.5 ppm | 106.25 ppm |
| OPC 5000 ppm IF4 & | 59.5 ppm | 60 ppm |

TABLE 4-continued

| | # Soaking Hours: | |
| --- | --- | --- |
| | 72 | 288 |
| QS w/ defoamer | | |
| OPC 5000 ppm P2 | 285 ppm | 340 ppm |
| OPC 5000 ppm P2 & QS w/ defoamer | 135 ppm | 200 ppm |

The samples were soaked at 50° C. with a constant swishing agitation, with HPLC used to measure the concentration of the fungal additives in the leachate. Under these harsh conditions the samples untreated by the QS formulation release the antifungal additive 1.5 to 2 times faster than the QS treated samples. This surprisingly indicates a considerable fungal efficacy durability advantage when QS is used in concrete systems.

Example 3

OIT was tested as an antifungal additive in conjunction with QS. Concrete samples were made and treated with formulations of 2:1 QS:OIT and 1:1 QS:OIT, with and without tributyl phosphate defoamer, and were tested using the water take up test discussed herein. The results are set forth in FIG. 7.

Figure 7:
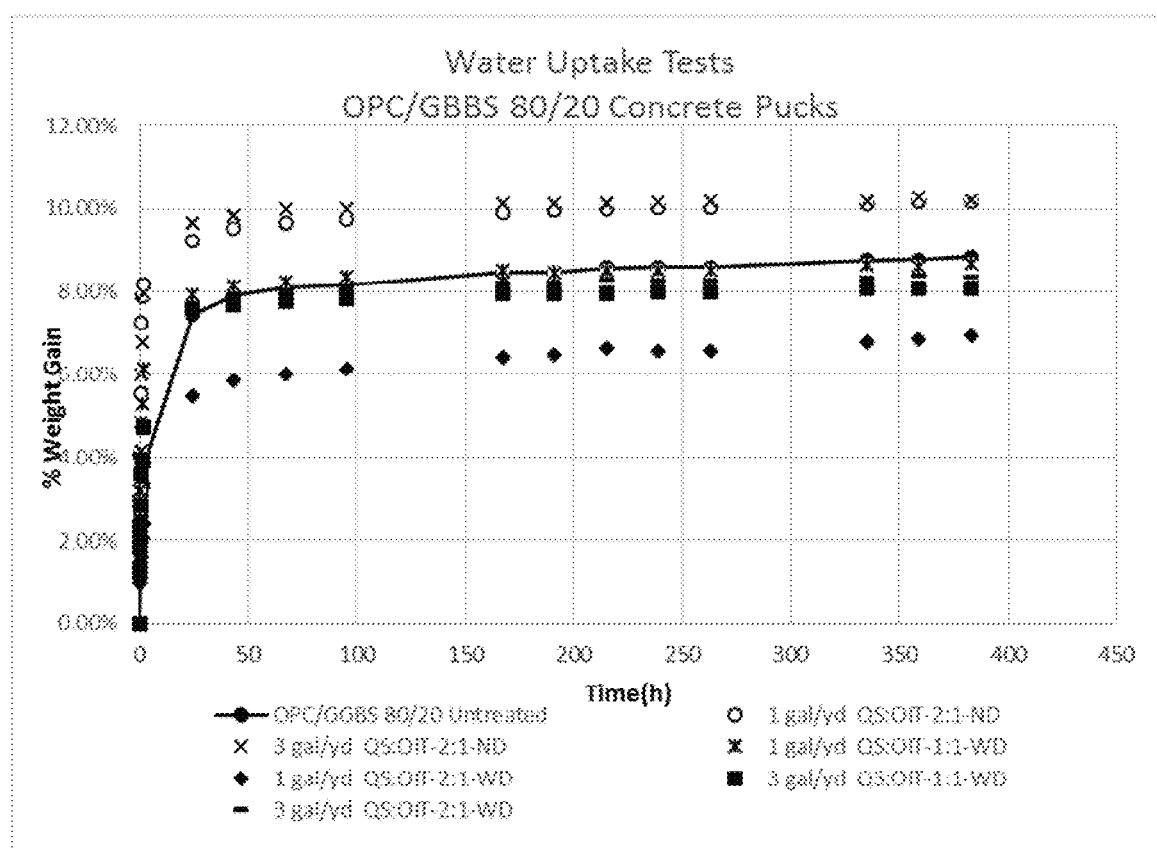
FIG. 7 is a graphical depiction of percent sample weight increase per time illustrating results of water uptake testing on 80% Ordinary Portland Cement (OPC) and 20% (GGBS or slag) concrete samples treated with a range of QS/OIT formulations with (WD) and without (ND) incorporated defoamer.

FIG. 7 is a graphical depiction of percent sample weight increase per time illustrating results of water uptake testing on 80% Ordinary Portland Cement (OPC) and 20% (GGBS or slag) concrete samples treated with a range of QS/OIT formulations with (WD) and without (ND) incorporated defoamer. The ratio in each formulation description was the ratio of QS to OIT active. The dose level of the QS/defoamer (gal/yd) was measured as the gallons per cubic yard of concrete of a 3.6% total active QS/OIT formulation in water. The sample pucks were dried in a 70° C. oven until the weight was stable for 24 h, then immersed into 30° C. water with their weight measured periodically to determine water uptake. Two puck samples were averaged per point. The result was expressed as a present weight gain to indicate water pickup and penetration into the sample.

It was clearly seen that the two samples with no defoamer absorb more water than the other samples, while the sample with the highest level of QS absorbs the least showing the impact of the defoamer. Most samples clustered about the untreated control sample indicating that the formula was correctly compensating for the foaming effects of the QS.

Testing was also conducted to determine whether the addition of the defoamer or mixing the QS and OIT together would have any effect on the microbial efficacy of these components. MIC testing against *Aspergillus niger* and *Fusarium oxysporum* showed there was no effect. Results are shown in Table 5:

TABLE 5

| Antifungal/QS | Tributyl Phosphate Defoamer | *Fusarium oxysporum* (ppm) | *Aspergillus niger* (ppm) |
| --- | --- | --- | --- |
| OIT:QS | | | |
| 1:1 | No | 6.3 | 12.5 |
| 2:1 | No | 12.5 | 12.5 |
| 1:1 | Yes | 6.3 | 6.3 |
| 2:1 | Yes | 12.5 | 12.5 |
| QS only | No | 15.6 | 125 |
| OIT | No | 6.3 | 6.3 |

It will therefore be readily understood by those persons skilled in the art that the present invention is susceptible of broad utility and application. Many embodiments and adaptations of the present invention other than those herein described, as well as many variations, modifications and equivalent arrangements, will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements.

What is claimed is:

1. A formulation comprising:
   a material that is in a wet-state in which the material is an uncured concrete, an uncured cementitious material, or a combination thereof,
   a Quat Silane that cures on and within the material,
   a fungicide selected from the group consisting of Sodium OrthophenylPhenol, Imazalil Sulphate, diiodomethyl-p-tolylsulfone, carbamate, isothiazolinone, azole, chlorothalonil, zinc pyrithione, copper pyrithione, sodium pyrithione, and a combination thereof,
   a defoamer,
   wherein the ratio of the Quat Silane to the fungicide in the formulation is in a range of about 10:1 to about 1:10.

2. The formulation according to claim 1, wherein the ratio of the Quat Silane to the fungicide in the formulation is in a range of about 5:1 to about 1:5.

3. The formulation according to claim 1, wherein the defoamer is selected from the group consisting of polyether amine, ethoxylated alcohol, silicone-based defoamer, tributyl phosphate, and a combination thereof.

4. The formulation according to claim 1, wherein the defoamer is from about 2 weight % to about 25 weight % of the amount of the Quat Silane in the formulation.

5. The formulation according to claim 1, wherein the carbamate is selected from the group consisting of Iodopropynyl butylcarbamate (IPBC), carbendazim, and a combination thereof.

6. The formulation according to claim 1, wherein the isothiazolinone is selected from the group consisting of OIT (2-Octyl-2H-isothiazol-3-one), DCOIT (4,5-Dichloro-2-octyl-4-isothiazolin-3-one), BBIT (N-butyl-1, 2-benzisothiazolin-3-one), and a combination thereof.

7. The formulation according to claim 1, wherein the azole is selected from the group consisting of tebuconazole and propiconazole, and a combination thereof.

8. The formulation according to claim 1, wherein the Quat Silane is present at an effective amount to reduce bacteria and fungus in the material prior to curing.

* * * * *